United States Patent
Sakai et al.

(10) Patent No.: US 8,505,882 B2
(45) Date of Patent: Aug. 13, 2013

(54) DIFFUSER APPARATUS, AND DIFFUSER APPARATUS RUNNING METHOD

(75) Inventors: Itaru Sakai, Kawasaki (JP); Takeshi Tsuji, Kawasaki (JP); Masanori Nagafuji, Kawasaki (JP); Kazutoshi Ohashi, Kawasaki (JP); Minoru Yamamoto, Kawasaki (JP)

(73) Assignee: JFE Engineering Corporation, Kanagawa (JP)

( * ) Notice: Subject to any disclaimer, the term of this patent is extended or adjusted under 35 U.S.C. 154(b) by 464 days.

(21) Appl. No.: 12/734,866

(22) PCT Filed: Dec. 25, 2008

(86) PCT No.: PCT/JP2008/073562
§ 371 (c)(1),
(2), (4) Date: May 25, 2010

(87) PCT Pub. No.: WO2009/084576
PCT Pub. Date: Jul. 9, 2009

(65) Prior Publication Data
US 2010/0300965 A1    Dec. 2, 2010

(30) Foreign Application Priority Data

Dec. 27, 2007 (JP) ................................ 2007-338380
May 19, 2008 (JP) ................................ 2008-131043

(51) Int. Cl.
*B01F 3/04*    (2006.01)

(52) U.S. Cl.
USPC ........................................ 261/28; 261/122.1

(58) Field of Classification Search
USPC ...................... 261/28, 122.1, 122.2
See application file for complete search history.

(56) References Cited

U.S. PATENT DOCUMENTS

| | | | | |
|---|---|---|---|---|
| 2,689,714 | A * | 9/1954 | French | 261/39.1 |
| 4,639,314 | A * | 1/1987 | Tyer | 210/220 |
| 5,051,193 | A * | 9/1991 | Cummings, Jr. | 210/752 |
| 5,597,491 | A * | 1/1997 | Winkler | 210/754 |
| 6,086,658 | A * | 7/2000 | Gohara et al. | 95/189 |
| 2003/0121852 | A1* | 7/2003 | Katsu et al. | 210/609 |
| 2006/0175243 | A1* | 8/2006 | Mahendran et al. | 210/321.69 |

FOREIGN PATENT DOCUMENTS

| | | |
|---|---|---|
| JP | 10-099663 | 4/1998 |
| JP | 2000-051885 | 2/2000 |
| JP | 2000-343095 | 12/2000 |
| JP | 2004-033889 | 2/2004 |
| JP | 2004-305886 | 11/2004 |
| JP | 2006-061817 | 3/2006 |
| JP | 2006-187728 | 7/2006 |

* cited by examiner

*Primary Examiner* — Charles Bushey
(74) *Attorney, Agent, or Firm* — Muramatsu & Associates

(57) ABSTRACT

A diffuser apparatus which has fine pores is capable of achieving a high oxygen transfer efficiency and rarely becoming clogged so that the apparatus can be operated stably over a prolonged period. The diffuser apparatus includes: an aeration plate that is disposed in an aeration tank in order to release pressurized air, fed from a diffusing air feed pipe, as air bubbles from fine pores formed in an aeration plate surface; blow water feeder for feeding blow water into the diffusing air feed pipe; and an inserted pipe for discharging the blow water, fed into the diffusing air feed pipe, from the aeration plate.

10 Claims, 6 Drawing Sheets

DIFFUSER APPARATUS, AND DIFFUSER APPARATUS RUNNING METHOD

This application is a U.S. national stage entry of International Patent Application No. PCT/JP2007/073562, filed Dec. 25, 2008, claiming the benefit of foreign filing priority under 35 U.S.C. 119(e) based on Japanese Patent Application No. 2007-338380, filed Dec. 27, 2007 and Japanese Patent Application No. 2008-131043, filed May 19, 2008, the entire contents of which are incorporated herein by reference.

TECHNICAL FIELD

The present invention relates to a diffuser apparatus and a diffuser apparatus running method for feeding a gas containing oxygen, such as air, into a mixed liquid containing activated sludge and waste water from an aeration plate disposed in an aeration tank of a sewage treatment facility or the like, and more particularly to a diffuser apparatus and a diffuser apparatus running method with which a dirt component adhered to a surface of the aeration plate can be removed, and the gas containing oxygen, such as air, can be fed with stability over a prolonged period.

BACKGROUND ART

To remove nitrogen compounds and carbon compounds from waste water in a sewage treatment facility, an activated sludge method employing decomposition and adsorption by microorganisms is used. To activate the microorganisms in the waste water, the microorganisms must be provided with oxygen. A diffuser apparatus is disposed in a bottom portion of an aeration tank in the sewage treatment facility or the like to feed oxygen into a mixed liquid containing activated sludge and waste water. A diffuser apparatus in which an aeration plate surface for releasing air bubbles is constituted by a membrane as shown in Japanese Patent Application Publication No. 2003-320388 and a diffuser apparatus in which the aeration plate surface is constituted by a thin metal plate as shown in Japanese Patent Application Publication No. 2006-61817 exist as diffuser apparatuses. The diffuser apparatus in which the aeration plate surface is constituted by a thin metal plate is superior in terms of durability and ease of maintenance inspections, and undergoes less pressure loss during a diffusing operation.

When a diffuser apparatus performs a diffusing operation continuously over a prolonged period, dirt components adhere to the interior and the surface of fine pores formed in the aeration plate surface, causing clogging. The main dirt component that causes this clogging is a biofilm formed by the microorganisms, which causes clogging by blocking the fine pores. The biofilm exerts a powerful adhesive force and cannot therefore be peeled away even when a gas pressure of the air or the like that is fed during the diffusing operation is increased.

The following method has been proposed as a method for removing a biofilm that causes clogging.

A method in which a biofilm produced by microorganisms adhered to the interior and surface of fine pores formed in a membrane is removed by expanding or contracting the membrane through an air blowing operation in which an amount of air blown by the diffuser apparatus is increased and decreased or the like has been disclosed as a method for use in a membrane-type diffuser apparatus by, for example, Japanese Patent Application Publication No. 2004-313938.

However, in a thin metal plate-type diffuser apparatus, the aeration plate surface is not flexible, and therefore a method such as that described above, which is applied to a membrane-type diffuser apparatus, cannot be used. Hence, at present, when microorganisms multiply and cause clogging in a thin metal plate-type diffuser apparatus, the thin aeration plate is cleaned by raising the diffuser apparatus to the water surface. As a result, maintenance of the diffuser apparatus involves large amounts of labor and expense.

Further, in both the membrane type and the thin metal plate type, a pore diameter of the fine pores formed in the aeration plate surface must be reduced to improve the oxygen transfer efficiency. However, clogging becomes steadily more likely to occur as the pore diameter decreases, and therefore an apparatus exhibiting a high oxygen transfer efficiency is more likely to become clogged. As described above, a diffuser apparatus that is likely to become clogged must be raised to the water surface frequently in order to clean the thin aeration plate, and therefore maintenance of the diffuser apparatus involves large amounts of labor and expense.

DISCLOSURE OF THE INVENTION

Hence, conventional diffuser apparatuses do not provide sufficient means for solving the problem of clogging on the aeration plate surface. An object of the present invention is to provide a diffuser apparatus which has fine pores capable of achieving a high oxygen transfer efficiency and which rarely becomes clogged, enabling stable operations over a prolonged period.

To solve the problem described above, the inventor conceived of injecting water, washing water such as chemical solution, or the like into a diffusing air feed pipe, feeding the injected water to an aeration plate side using pressurized air or the like serving as diffusing air, and blowing a surface of the aeration plate using the washing water or the like.

The present invention has been designed on the basis of this finding, and includes the following specific constitutions.

(1) A diffuser apparatus according to the present invention includes: an aeration plate that is disposed in an aeration tank in order to release pressurized air, fed from a diffusing air feed pipe, as air bubbles from fine pores formed in an aeration plate surface; blow water feeding means for feeding blow water into the diffusing air feed pipe; and discharging means for discharging the blow water, fed into the diffusing air feed pipe, from the aeration plate.

(2) Further, in the apparatus described in (1), the discharging means is constituted by an inserted pipe, an upper end of which communicates with the aeration plate and a lower end of which is inserted into the diffusing air feed pipe.

(3) Further, in the apparatus described in (2), a lower end surface of the inserted pipe has an inclined suction surface through which the blow water is suctioned.

(4) Further, in the apparatus described in (2) or (3), an air hole is provided in a pipe wall of the inserted pipe.

(5) In a diffuser apparatus running method according to the present invention, which is employed in a diffuser apparatus including: an aeration plate that is disposed in an aeration tank in order to release pressurized air, fed from a diffusing air feed pipe, as air bubbles from fine pores formed in an aeration plate surface; blow water feeding means for feeding blow water into the diffusing air feed pipe; and discharging means for discharging the blow water, fed into the diffusing air feed pipe, from the aeration plate, the blow water is discharged from the aeration plate periodically.

(6) Further, in the method described in (5), the discharging means is constituted by an inserted pipe, an upper end of which communicates with the aeration plate and a lower end of which is inserted into the diffusing air feed pipe.

(7) Further, in the method described in (5) or (6), the blow water contains a component that kills microorganisms.

In the diffuser apparatus according to the present invention, the blow water is fed into the diffusing air feed pipe, whereupon the blow water fed into the diffusing air feed pipe is discharged from the aeration plate, and therefore the diffuser apparatus can be provided with fine pores capable of achieving a high oxygen transfer efficiency while rarely becoming clogged, enabling stable operations over a prolonged period.

EXPLANATION OF REFERENCE NUMERALS

| 1 | diffuser apparatus (first embodiment) |
| --- | --- |
| 2 | gas feeding means |
| 3 | diffusing air feed pipe |
| 4 | aeration plate |
| 4a | aeration plate surface |
| 5 | blow water feeding means |
| 7 | inserted pipe |
| 7a | valve seat |
| 8 | suction surface |
| 9 | air hole |
| 10 | fixing fastening member |
| 11 | attachment bracket |
| 12 | aeration tank |
| 14 | blow water feed pipe |
| 15, 16 | open/close valves |
| 17 | slit |
| 19 | check valve |
| 21 | diffuser apparatus (fourth embodiment) |
| 23 | blow-off pipe |

-continued

| 23a | blow-off port |
| --- | --- |
| 25 | open/close valve |
| 27 | control means |
| θ | incline angle |

BEST MODE FOR CARRYING OUT THE INVENTION

First Embodiment

1. Diffuser Apparatus

Figure 1:
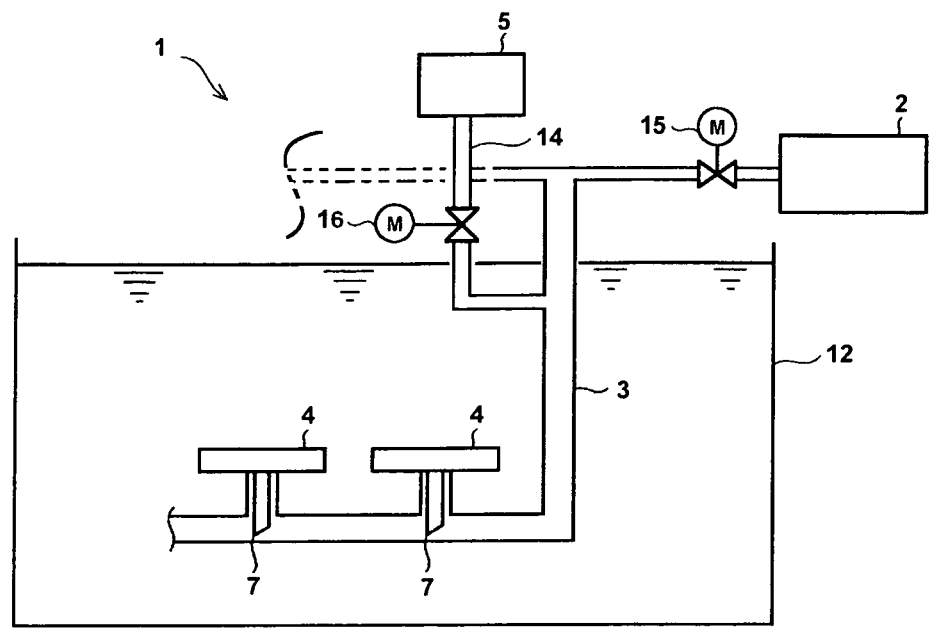
FIG. 1 is a pattern diagram of a diffuser apparatus according to a first embodiment of the present invention.

FIG. 1 is a pattern diagram showing a diffuser apparatus according to a first embodiment. A diffuser apparatus 1 according to the first embodiment includes gas feeding means 2 for feeding a gas such as air, a diffusing air feed pipe 3 (a header pipe) for leading the air or the like fed from the gas feeding means 2 to an aeration plate 4, the aeration plate 4, which receives the air fed from the diffusing air feed pipe 3 and releases fine air bubbles, an inserted pipe 7, an upper end of which communicates with the aeration plate 4 and a lower end of which is inserted into the diffusing air feed pipe 3, and blow water feeding means 5 for feeding blow water to the diffusing air feed pipe 3 via a blow water feed pipe 14.

The diffusing air feed pipe 3 is provided with an open/close valve 15, and the blow water feed pipe 14 is provided with an open/close valve 16.

Principal constitutions of the diffuser apparatus 1 will be described in detail below.

(Aeration Plate)

The aeration plate 4 may be any type of aeration plate, such as a membrane type or a thin metal plate type. For example, when the aeration plate 4 is a thin metal plate type, a thin metal plate having slit-shaped fine pores formed by machining is used. The air fed by the gas feeding means 2 is blown onto the aeration plate 4 from the diffusing air feed pipe 3 through the inserted pipe 7 and released from the plurality of fine pores scattered over an aeration plate surface 4a of the aeration plate 4.

(Inserted Pipe)

The upper end of the inserted pipe 7 communicates with the aeration plate 4, and the lower end is inserted into the diffusing air feed pipe 3. Thus, the inserted pipe 7 discharges the blow water fed to the diffusing air feed pipe 3 from the aeration plate 4. Accordingly, the inserted pipe 7 corresponds to discharging means of the present invention.

Since the diffuser apparatus 1 according to the first embodiment is provided with the inserted pipe 7, water in the diffusing air feed pipe 3 can be fed to the aeration plate surface 4a of the aeration plate 4 without filling the diffusing air feed pipe 3 with water. Hence, a large amount of water is not required, and when aqueous solution containing an antibacterial agent is fed, microorganisms can be removed particularly efficiently in a short period of time using a small amount of the antibacterial agent. As a result, the aeration plate 4 does not have to be raised to the water surface frequently for cleaning, and the aeration plate 4 can be operated underwater with stability over a prolonged period.

When water is supplied for cleaning the aeration plate 4 in a case where the inserted pipe 7 is not provided, the diffusing air feed pipe 3 must be filled with water, as noted above, and therefore means for draining the water following cleaning of the aeration plate 4 must be provided. If means for draining the water is not provided, the water remains in the diffusing air feed pipe to which the aeration plate 4 is attached, thereby narrowing a passage through which the diffusing air passes, and as a result, a diffusing operation cannot be performed appropriately. According to this embodiment, in which the inserted pipe 7 is provided, the water that is fed to the diffusing air feed pipe 3 can be discharged from the aeration plate 4 without providing separate means for draining the water fed to the diffusing air feed pipe 3, and therefore an improvement in convenience is achieved.

Figure 2:
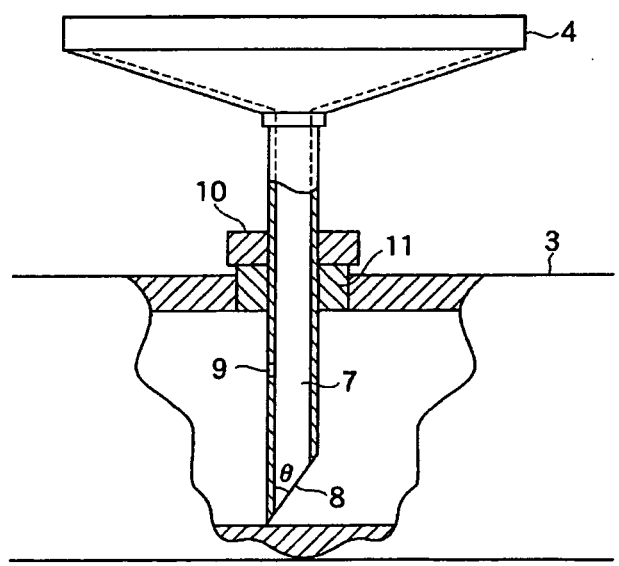
FIG. 2 is a partial sectional view of an inserted pipe according to the first embodiment of the present invention.

FIG. 2 is a partial sectional view showing an example of the inserted pipe 7. As shown in FIG. 2, the upper end of the inserted pipe 7 communicates with the aeration plate 4 and the lower end is inserted into the diffusing air feed pipe 3. A lower end portion of the inserted pipe 7 forms an inclined suction surface 8, and an air hole 9 is provided in a pipe wall. The air hole 9 provided in the pipe wall of the inserted pipe 7 is not a necessity, hence this air hole 9 may be omitted. As will be described below, the manner in which the blow water is pumped into the inserted pipe 7 differs depending on whether or not the air hole 9 is provided.

The inserted pipe 7 functions as a feed path for feeding diffusing air to the aeration plate 4, and when the aeration plate 4 is subjected to water blowing processing, the inserted pipe 7 functions to discharge the water fed to the diffusing air feed pipe 3 from the aeration plate 4.

The inserted pipe 7 may be formed integrally with the diffusing air feed pipe 3 or constituted by a separate member that can be attached to and detached from the diffusing air feed pipe 3. When the inserted pipe 7 is constituted by an attachable separate member, it may be inserted into an insertion port provided in the diffusing air feed pipe 3 in advance and then fixed. There are no particular limitations on the method of fixing the inserted pipe 7, and various fixing methods may be employed. For example, the inserted pipe 7 may be fixed to the diffusing air feed pipe 3 by welding a fixing fastening member 10 to a side face of the inserted pipe 7 in advance, welding an attachment member 11 to the diffusing air feed pipe side in advance, and screwing the fixing fastening member 10 welded to the side face of the inserted pipe 7 to the attachment member 11.

Similarly, the aeration plate 4 may be formed integrally with the inserted pipe 7 or attached to and detached from the inserted pipe 7. There are no particular limitations on the material of the inserted pipe 7, but the inserted pipe 7 is preferably formed from plastic or a metal such as stainless steel or titanium.

Figure 3:
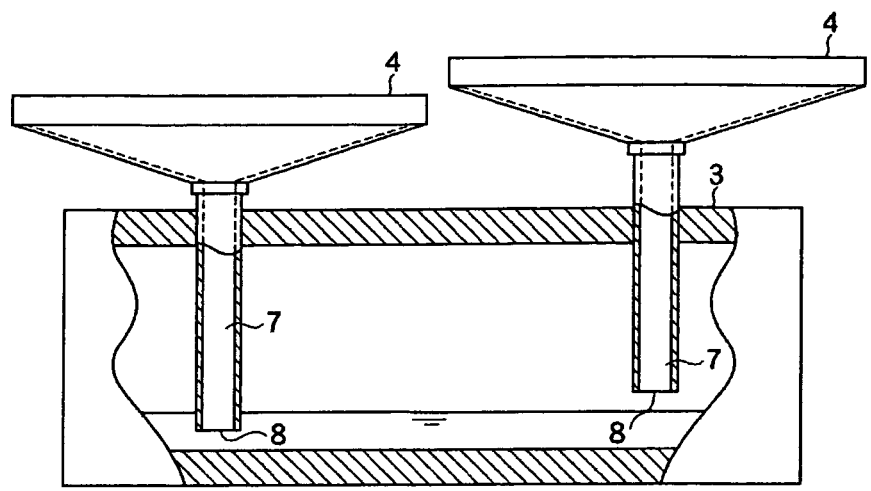
FIG. 3 is a pattern diagram showing an aspect of the inserted pipe according to the first embodiment of the present invention in which a suction surface is not inclined.

The lower end portion of the inserted pipe 7 serves as the suction surface 8 for suctioning the water fed to the diffusing air feed pipe 3. The diffusing air feed pipe 3 is provided with a plurality of the aeration plates 4, but the diffusing air feed pipe 3 is not always disposed horizontally. Therefore, the respective lower ends of the inserted pipes 7 corresponding to the plurality of aeration plates 4 are not always disposed at an identical height relative to a water surface of the water fed to the diffusing air feed pipe 3. As shown in FIG. 3, if the suction surface 8 on the lower end of the inserted pipe 7 is not inclined in such a case, water suction (in this specification, cases where the term "suction" is used may include "push-up") occurs through inserted pipes 7 whose lower end portions are in contact with the water surface or under the water surface, as shown on the left side of FIG. 3, but water suction does not occur through inserted pipes 7 whose lower end portions are above the water surface, as shown on the right side of FIG. 3. Hence, when the diffusing air feed pipe 3 is not disposed horizontally, the blow water may not be fed evenly to all of the aeration plates 4, and as a result, the aeration plates to which the blow water is not fed may become clogged partially.

Figure 4:
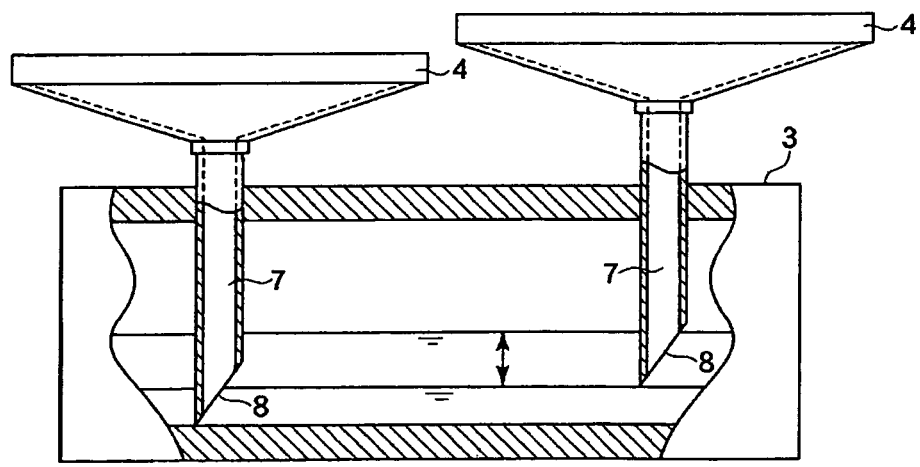
FIG. 4 is a pattern diagram showing another aspect of the inserted pipe according to the first embodiment of the present invention in which the suction surface is inclined.

When the suction surface 8 on the lower end of the inserted pipe is inclined, on the other hand, as shown in FIG. 4, the blow water can be suctioned as long as the water surface is between an upper end and a lower end of the suction surface 8. Hence, even when the diffusing air feed pipe 3 is not horizontal such that a deviation occurs between vertical positions of the inserted pipe lower ends relative to the water surface in the diffusing air feed pipe 3, suction can be performed through all of the inserted pipes 7, as long as the deviation is within a predetermined range, and therefore blowing can be performed evenly on all of the aeration plates 4. In other words, when the suction surface 8 is inclined, an allowable range of a horizontal direction arrangement precision of the diffusing air feed pipe 3 increases.

Figure 5:
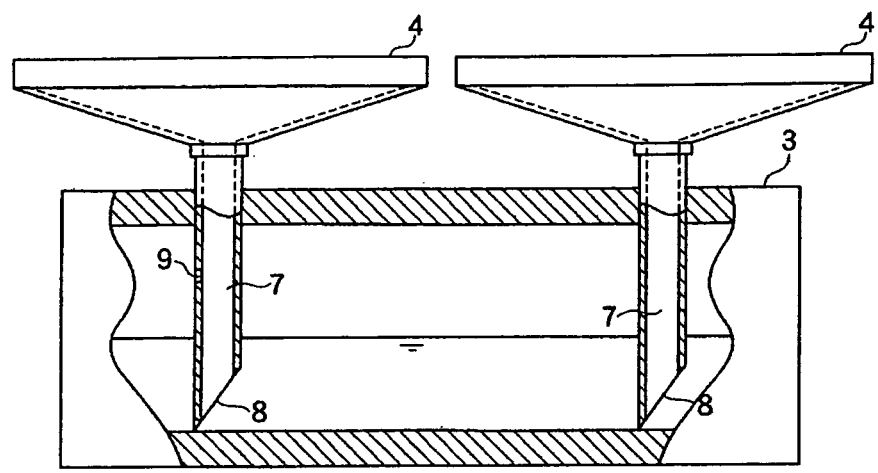
FIG. 5 is an illustrative pattern diagram of the inserted pipe according to the first embodiment of the present invention, showing an effect of an air hole provided in the inserted pipe.

Further, when the water level is at a midway point on the suction surface 8, as shown in FIG. 4, both water and air are suctioned into the inserted pipe 7, and therefore a mixed flow of water and air is blown at a high blowing speed. When the water level is higher than the suction surface 8, on the other hand, as shown on the right side of FIG. 5, only water is suctioned, and therefore extrusion blowing is performed to push up only water not intermixed with air. When the air hole 9 is disposed in the pipe wall of the inserted pipe 7, as shown on the left side of FIG. 5, air enters through the air hole 9 even if the water level is higher than the suction surface 8, and therefore a mixed flow of water and air can be blown at a high blowing speed.

There are no particular limitations on the shape and size of the air hole 9, and the shape and size may be set as desired. For example, when an overall length of the inserted pipe 7 is 200 mm and an inner diameter of the inserted pipe 7 is 13 mm, the air hole 9 may be formed in a circular shape having a diameter of 1 mm to 10 mm, and preferably 2 mm to 7 mm.

There are also no particular limitations on the position of the air hole 9, and the air hole 9 may be positioned as desired. For example, in a case where an inserted pipe having an overall length of 200 mm and an inner diameter of 13 mm is fitted to a diffusing air feed pipe having an inner diameter of 80 mm such that the lower end of the inserted pipe contacts an inside bottom portion of the diffusing air feed pipe, the air hole 9 may be provided in a position located 10 mm to 75 mm, and preferably 30 mm to 70 mm, from the lower end of the inserted pipe.

Further, the interior of the diffusing air feed pipe is pressurized, and therefore the air hole 9 may be positioned on either a front surface side or a back surface side relative to a water blowing and gas flow direction.

The lower end of the inclined suction surface 8 is positioned near the inside bottom of the diffusing air feed pipe 3 so that even when the water level is low, blow water can be suctioned into the inserted pipe 7 reliably. More specifically, the lower end of the inclined suction surface 8 is preferably positioned 0 mm to 10 mm above the inside bottom of the diffusing air feed pipe 3.

There are no particular limitations on an incline angle θ of the inclined suction surface 8 relative to a pipe axis direction of the inserted pipe 7, but since the inserted pipe 7 also serves as an air feed passage, the incline angle θ is preferably set such that a sufficient amount of air can be blown into the inserted pipe 7. More specifically, the incline angle θ is set at 10 to 85 degrees, for example, and preferably 30 to 80 degrees.

(Blow Water Feeding Means)

The blow water feeding means 5 is constituted by a device for feeding blow water to the diffusing air feed pipe 3 via the blow water feed pipe 14, and are formed such that blow water can be fed into the diffusing air feed pipe 3 against an air pressure of the diffusing air feed pipe 3. The blow water feeding means 5 may be formed by disposing a water pump in a water storage tank, for example.

The blow water fed by the blow water feeding means 5 flows into the diffusing air feed pipe 3 through the blow water feed pipe 14 and is pumped onto the aeration plate 4 from the diffusing air feed pipe 3 via the inserted pipe 7. Then, similarly to the air, the blow water is released from the plurality of fine pores scattered over the aeration plate surface 4a of the aeration plate 4.

To release the blow water from the fine pores more reliably, a device for raising an internal pressure of the diffusing air pipe may be provided separately to raise the internal pressure of the diffusing air feed pipe 3 after the blow water has been fed thereto.

2. Diffuser Apparatus Running Method

During a normal diffusing operation, the open/close valve 15 is open and the open/close valve 16 is closed.

Further, during a blowing operation in which water is blown onto the aeration plate 4, the open/close valve 16 is opened to feed blow water to the diffusing air feed pipe 3, whereby diffusing air and blow water are fed to the aeration plate 4 through the inserted pipe 7.

With the diffuser apparatus 1 according to the present invention, a biofilm adhered to the fine pores in the aeration plate 4 can be removed by periodically feeding blow water to the aeration plate 4 from the blow water feeding means 5 without raising the aeration plate 4 onto the water surface. Note that although there are no particular limitations on the frequency with which blow water is fed, blow water is preferably fed to the diffusing air feed pipe 3 every few hours to every few days.

As described above, the diffuser apparatus 1 according to this embodiment includes the inserted pipe 7 and periodically feeds blow water while feeding diffusing air. Hence, the diffuser apparatus 1 can be operated continuously while using the blow water to remove the biofilm adhered to the diffusing holes in the aeration plate 4.

There are no particular limitations on the water quality of the blow water in the embodiment described above, but by using blow water containing a component that kills the microorganisms producing the biofilm, multiplication of the microorganisms producing the biofilm can be suppressed effectively. There are no particular limitations on the component that kills the microorganisms producing the biofilm, but an antibacterial agent or an oxidation agent, for example, may be used, and more specific examples include sodium hypochlorite, cationic soap, acid, alkali, ozone, chlorine dioxide, alkali metal carbonate, and so on.

Second Embodiment

To make clogging less likely to occur even over a prolonged operation period, the inventor, having investigated the fine pores provided in the aeration plate surface 4a of the aeration plate 4, formed the fine pores as rectangular slits and determined optimum dimensions thereof.

Figure 6:
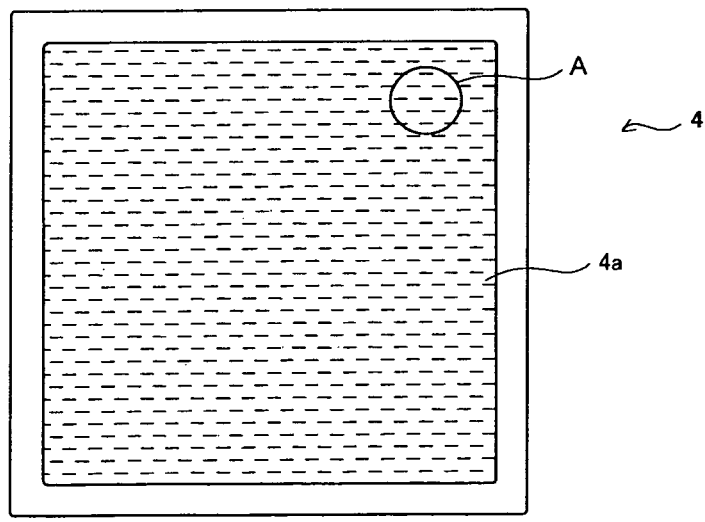
FIG. 6 is a plan view of an aeration plate according to a second embodiment of the present invention.
Figure 7:
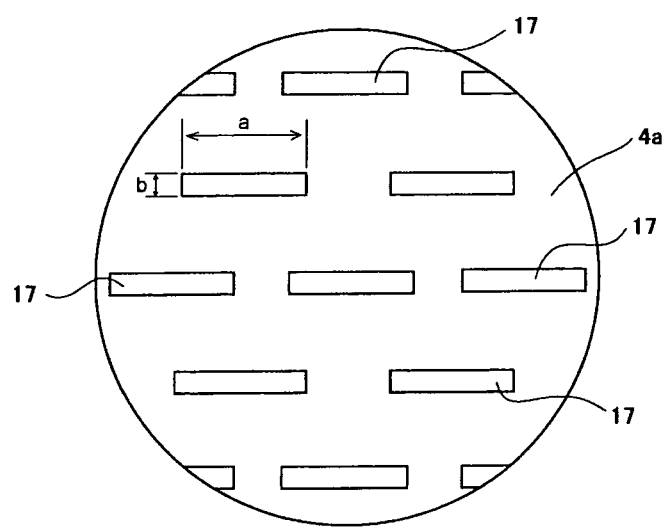
FIG. 7 is an enlarged view showing a partial enlargement of FIG. 6.

FIG. 6 is a plan view of the aeration plate 4 according to a second embodiment, and FIG. 7 is an enlarged view showing an enlargement of a portion A surrounded by a circle in FIG. 6. As shown in FIG. 7, a large number of rectangular slits 17 are provided in the aeration plate 4, and when the length of a long side of the slit 17 is a and the length of a short side is b, a is set between 0.1 mm and 1.5 mm, whereas b is set between 0.03 mm and 0.15 mm. The reason for setting the respective lengths of the short side and long side of the slit 17 in this manner is as follows.

When the fine pores provided in the aeration plate 4 are formed as the rectangular slits 17, a blockage suppression effect, according to which blockage of the slits 17 is suppressed using blow water to remove the biofilm adhered to the slits 17, is dependent on the short side length of the slits 17 such that the blockage suppression effect improves as the short side length increases.

However, when the short side length of the slits 17 is increased, an air bubble diameter increases, and therefore the oxygen transfer efficiency deteriorates.

Hence, the length of the short side of the slits 17 provided in the aeration plate surface 4a of the aeration plate 4 must be set such that the blockage suppression effect is great and the oxygen transfer efficiency is high.

It was determined through an experiment shown in a second example to be described below that in order to obtain a high oxygen transfer efficiency (at least 25%) and suppress increases in pressure loss due to blockages (such that a pressure loss increase is no more than 100 mmAq after 100 days from the start of the diffusing operation), the short side length of the slit should be between 0.03 mm and 0.15 mm. Further, when the length of the long side of the slit 17 is too great, the oxygen transfer efficiency is adversely affected, and therefore 0.1 mm to 1.5 mm was set as a range at which the oxygen transfer efficiency is not adversely affected.

In the second embodiment, the fine pores formed in the aeration plate 4 are provided in the form of the rectangular slits 17 and the length of the short side thereof is set between 0.03 mm and 0.15 mm. Hence, the effect of the blow water used to prevent the aeration plate from clogging can be enhanced, leading to an improvement in the oxygen transfer efficiency.

Third Embodiment

Figure 8:
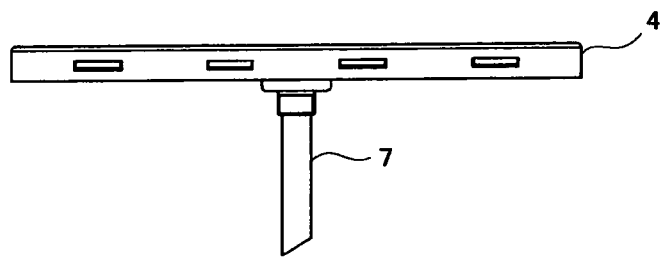
FIG. 8 is an illustrative view showing an aeration plate and an inserted pipe according to a third embodiment of the present invention.
Figure 9:
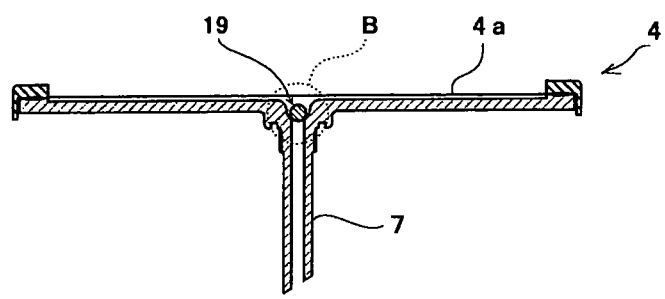
FIG. 9 is an end view showing a longitudinal cross-section of FIG. 8.
Figure 10:
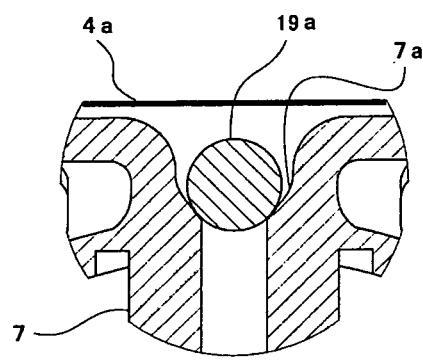
FIG. 10 is an enlarged view showing a partial enlargement of FIG. 9.

FIGS. 8 to 10 are views illustrating the aeration plate 4 according to a third embodiment. FIG. 8 is a front view, FIG. 9 is an end view showing a longitudinal cross-section of FIG. 8, and FIG. 10 is an enlarged view of a portion B surrounded by a circle in FIG. 9. Note that in the example shown in FIGS. 8 to 10, a member manufactured by forming slit-shaped fine pores in a thin metal plate is used as the aeration plate surface 4a having fine pores provided on the aeration plate 4.

When a power cut occurs or a blower is halted for a maintenance operation, waste water and active sludge may flow through the aeration plate in reverse, thereby forming a large floc in the interior of the aeration plate 4 which adheres to a rear surface of the aeration plate 4 or enters the openings in the aeration plate 4 when the diffusing operation is resumed, and this type of situation is one of major causes of clogging in the aeration plate 4. Hence, in the third embodiment, this type of situation is prevented by providing a check valve 19 between the inserted pipe 7 and the aeration plate surface 4a of the aeration plate 4, as shown in FIGS. 9 and 10.

The check valve 19 is manufactured by forming a valve seat 7a on an upper end inner surface of the inserted pipe 7 and disposing a spherical valve body 19a on the valve seat 7a. With this constitution, the valve body 19a moves upward when diffusing air or blow water is fed to the inserted pipe 7 so that the fed air or blow water is not obstructed, but when feeding of the air or blow water is halted, the valve body 19a is seated on the valve seat 7a to prevent waste water from flowing back to the inserted pipe 7 side.

In the diffuser apparatus according to this embodiment having the above constitution, the open/close valve 15 is open and the open/close valve 16 is closed during a normal diffusing operation. At this time, as described above, the valve body 19a floats above the valve seat 7a so that the passage of air is not obstructed.

When the gas feeding means 2 is halted due to a power cut or a maintenance operation, the valve body 19a is seated on the valve seat 7a, thereby preventing waste water backflow.

Further, during a blowing operation in which water is blown onto the aeration plate 4, the open/close valve 16 is opened such that blow water is fed to the diffusing air feed pipe 3, and as a result, diffusing air and blow water are fed to the aeration plate 4 via the inserted pipe 7. In this case, similarly to a diffusing operation, the valve body 19a floats above the valve seat 7a so that passage of the blow water is not obstructed.

As described above, in this embodiment, the check valve 19 is provided, and therefore waste water and active sludge do not flow back toward the interior side of the aeration plate 4 even when the gas feeding means 2 is halted due to a power cut or a maintenance operation. Hence, clogging of the aeration plate 4 due to backflow of waste water or the like can be prevented.

Note that in the above embodiment, a spherical body is cited as an example of the valve body 19a of the check valve 19, but the present invention is not limited thereto, and the valve body may be a disc-shaped member, for example.

Further, in this embodiment, a gap between the aeration plate surface 4a and the valve seat 7a is set to be narrow, and therefore the valve body 19a rises and falls in a predetermined movement range without providing a frame or the like for limiting the movement range of the valve body 19a. However, when the gap between the aeration plate surface 4a and the valve seat 7a is wide, a frame-shaped body may be provided to limit the movement range of the valve body 19a.

Fourth Embodiment

Figure 11:
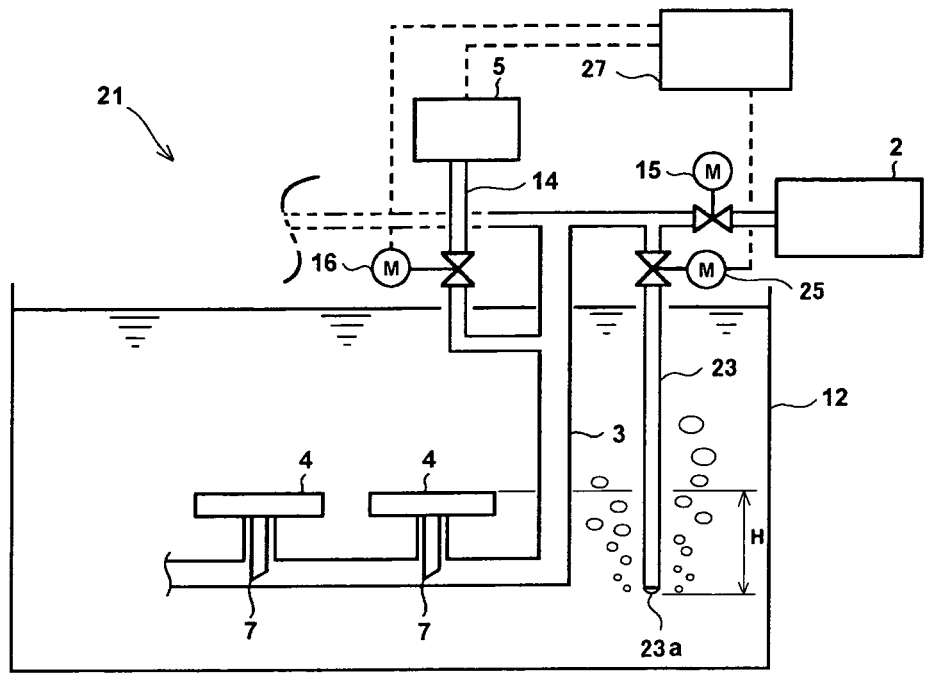
FIG. 11 is a pattern diagram showing a diffuser apparatus according to a fourth embodiment of the present invention.

FIG. 11 is a pattern diagram showing a diffuser apparatus according to a fourth embodiment. Identical reference symbols have been allocated to parts that are identical to those shown in FIG. 1.

When blow water is injected into the diffusing air feed pipe 3 to clean the aeration plates 4 during a diffusing operation in which air bubbles are released from the aeration plates 4, the injected blow water may be suctioned only into nearby inserted pipes. Alternatively, when the diffusing air feed pipe 3 to which the aeration plates 4 are attached includes a difference of elevation, the injected blow water may flow to a low position such that the blow water is suctioned only into inserted pipes 7 in a low position. In both cases, it may be impossible to clean all of the aeration plates 4 evenly.

Hence, the fourth embodiment provides an apparatus and a method for cleaning all of the aeration plates 4 evenly while continuing to blow air into the diffusing air feed pipe 3 during a diffusing operation.

A diffuser apparatus 21 according to this embodiment includes, in addition to the constitutions described in the first embodiment, a blow-off pipe 23 for regulating the internal pressure of the diffusing air feed pipe 3, in which one end side of the blow-off pipe 23 is connected to the diffusing air feed pipe 3 and another end side is submerged in the aeration tank 12, an open/close valve 25 provided in the blow-off pipe 23, and control means 27 for performing open/close control of the open/close valve 25 as well as the open/close valve 16 provided in the blow water feed pipe 14 and performing operation control of the blow water feeding means 5.

(Blow-off Pipe)

The blow-off pipe 23 regulates the internal pressure of the diffusing air feed pipe 3, and is formed such that one end side is connected to the diffusing air feed pipe 3 and the other end side is submerged in the aeration tank 12. The open/close valve 25 is provided at a midway point on the blow-off pipe 23 in order to perform open/close operations in response to a control signal from the control means 27.

A blow-off port 23a is provided on the end portion of the blow-off pipe 23 that is submerged in the aeration tank 12, and when the open/close valve 25 opens, the pressurized air in the diffusing air feed pipe 3 is released through the blow-off port 23a. As shown in FIG. 11, the position of the blow-off port 23a is set to be below the position of the aeration plate 4 by a distance of Hmm.

By setting the position of the blow-off port 23a at a distance of Hmm, the internal pressure of the diffusing air feed pipe 3 reaches a water pressure acting on the aeration plate 4+HmmAq when the open/close valve 25 is opened such that air is blown through the blow-off port 23a. Therefore, when HmmAq is equal to or smaller than a pumping pressure required to pump the water in the diffusing air feed pipe 3 into the inserted pipe 7, blow water fed into the diffusing air feed pipe 3 remains in the diffusing air feed pipe 3 without being suctioned into the inserted pipe 7.

Here, the inventor learned through investigation that the pumping pressure is within a range of 100 mm to 600 mmAq, and therefore Hmm is set to be larger than 0 and within a range of 100 mm to 600 mm, or less.

Next, a running method of the diffuser apparatus 21 according to the fourth embodiment having the above constitution will be described.

During a normal diffusing operation, the open/close valve 25 and the open/close valve 16 are closed. In this state, the gas feeding device 2 is operated under separate control and the open/close valve 15 is opened, whereby the pressurized air in the diffusing air feed pipe 3 is fed to the aeration plate 4 and diffused. During a blowing operation in which blow water is fed to the aeration plate 4, first, the open/close valve 25 provided in the blow-off pipe 23 is opened. As a result, the pressurized air in the diffusing air feed pipe 3 is released through the blow-off port 23a in the blow-off pipe 23, whereby the internal pressure of the diffusing air feed pipe 3 reaches water pressure+HmmAq without modifying the state of the separately controlled gas feeding means 2 and open/close valve 15. In this state, the blow water feeding means 5 is operated and the open/close valve 16 provided in the blow water feed pipe 14 is opened. As a result, blow water flows into the diffusing air feed pipe 3 through the blow water feed pipe 14.

At this time, the internal pressure of the diffusing air feed pipe 3 is water pressure+HmmAq, and therefore the blow water continues to flow through the diffusing air feed pipe 3 to which the aeration plate 4 is attached without being suctioned into the inserted pipe 7. When a predetermined amount of blow water has been fed following the elapse of a predetermined amount of time, blow water feeding is halted by closing the open/close valve 16. Further, when air blowing is halted by closing the open/close valve 25, the internal pressure of the diffusing air feed pipe 3 rises, and when the internal pressure exceeds water pressure+pumping pressure, the blow water held in the diffusing air feed pipe 3 is suctioned into the inserted pipes 7 of all of the aeration plates 4 and discharged through the diffusing pores in the aeration plates 4, thereby cleaning the aeration plates 4.

Note that since the suction surface 8 of the inserted pipe 7 extends to a lower surface position of the diffusing air feed pipe 3, substantially all of the blow water in the diffusing air feed pipe 3 is discharged. Thereafter, the normal diffusing operation is continued.

When the diffusing air feed pipe 3 is not disposed horizontally such that the lower end positions of the inserted pipes 7 deviate from the horizontal, pumping may be halted during the blow water feeding described above such that blow water is held in the diffusing air feed pipe 3 up to a level that takes this deviation into account. Thus, at least the predetermined amount of blow water can be fed to all of the aeration plates 4 without waste.

As described above, in this embodiment, the blow-off pipe 23 is employed as pressure regulating means for regulating the internal pressure of the diffusing air feed pipe 3 to a predetermined pressure, and therefore the internal pressure of the diffusing air feed pipe 3 can be regulated to the predetermined pressure easily and by means of a simple structure. As a result, the blow water can be held in the diffusing air feed pipe 3 with causing the waste water in the aeration tank to flow back through the fine pores in the aeration plate surface 4a of the aeration plate 4, and therefore all of the aeration plates 4 can be cleaned evenly.

In the above description, the blow-off pipe 23 is used as a device for regulating the internal pressure of the diffusing air feed pipe, however, a device other than the blow-off pipe 23, for example a device such as a pressure regulating valve that is attached to the diffusing air feed pipe 3 in order to regulate the internal pressure of the diffusing air feed pipe 3, may be used instead. In another method, pressure regulation may be performed by adjusting the amount of air fed by the gas feeding device 2 and/or an opening of the open/close valve 15. In this case, the gas feeding device 2 and the open/close valve 15 may be controlled by the control means 27.

FIRST EXAMPLE

First, to verify the water blowing effect generated by the inserted pipe 7, an aeration plate having slits with a comparatively small short side length (a narrow width) was disposed in an aeration tank, whereupon water blowing was implemented under the following conditions.

Aeration plate material: SUS316L
Pore shape: length 1.45 mm, short side (width) 0.04 mm
Hole area ratio: approximately 0.5%
Air amount: 30 m$^3$/m$^2$/hr
Blow water: sodium hypochlorite solution (concentration: 100 ppm)
Blow water amount: 500 ml per operation
Water blowing frequency: once per day Note that an example in which water blowing was not implemented will be used as a comparative example.

Figure 12:
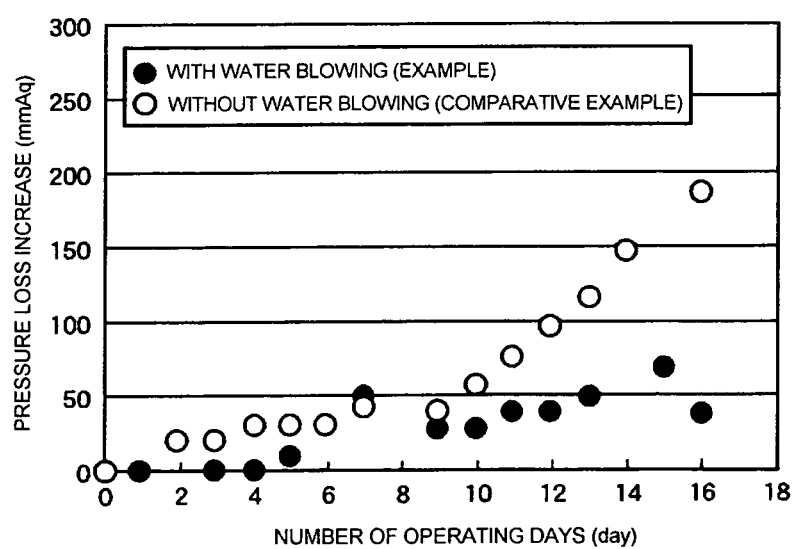
FIG. 12 is an illustrative view illustrating an effect of water blowing according to an example of the present invention using a graph showing temporal variation in a pressure loss increase.

FIG. 12 is a graph showing temporal variation in a pressure loss increase (mmAq) in the example where water blowing was implemented (example) and the example where water blowing was not implemented (comparative example).

As is evident from the graph shown in FIG. 12, by implementing water blowing periodically, it was possible to suppress increases in pressure loss in the diffuser apparatus effectively even when the diffusing operation was performed over a prolonged period. As a result, it was possible to maintain the oxygen transfer efficiency at a high level.

SECOND EXAMPLE

Next, to confirm the effect of variation in the short side length of the slit, an aeration plate having slits with a different short side length was disposed in an aeration tank, whereupon a continuous diffusing operation was implemented under the following conditions.

Aeration plate material: SUS316L
Slit long side length: 0.5 mm
Air amount: 30 m$^3$/m$^2$/hr
Blow water: sodium hypochlorite solution (concentration: 20 ppm)
Blow water amount: 500 ml per operation
Water blowing frequency: twice per day Table 1 shows the oxygen transfer efficiency of the employed aeration plate (at the start of the diffusing operation) and the pressure loss increase after 100 days from the start of the diffusing operation.

TABLE 1

| | Slit short side length (mm) | | | | | | | | |
|---|---|---|---|---|---|---|---|---|---|
| | 0.02 | 0.03 | 0.06 | 0.08 | 0.10 | 0.12 | 0.15 | 0.16 | 0.18 |
| Oxygen transfer efficiency (%) | 43.0 | 41.2 | 40.3 | 37.6 | 35.2 | 32.1 | 28.5 | 24.7 | 23.2 |
| Pressure loss increase (mmAq) after 100 days | 121 | 97 | 82 | 70 | 60 | 53 | 50 | 48 | 46 |

As is evident from Table 1, when the slit short side length is set at 0.15 mm or less, a high oxygen transfer efficiency of at least 25% is obtained. On the other hand, as the slit short side increases in length, clogging substances are removed more easily by water blowing, thereby reducing the pressure loss increase after 100 days. Hence, when the slit short side length is 0.03 mm or more, the pressure loss increase after 100 days is no greater than 100 mmAq.

It was confirmed from these facts that when the short side length of the slit is set within a range of 0.03 mm to 0.15 mm, a high oxygen transfer efficiency of at least 25% is obtained and clogging substances can be removed effectively by water blowing.

Further, when the short side length of the slit is set within a range of 0.08 mm to 0.12 mm, an extremely high oxygen transfer efficiency of at least 30% is obtained and the pressure loss increase after 100 days is no greater than 70 mmAq. Accordingly, clogging substances can be removed even more effectively by water blowing, and therefore this range is preferable.

The invention claimed is:
1. A diffuser apparatus, comprising:
an aeration plate that is disposed in an aeration tank in order to release pressurized air, fed from a diffusing air feed pipe, as air bubbles from fine pores formed in an aeration plate surface;
blow water feeding means for feeding blow water into said diffusing air feed pipe against an air pressure of said diffusing air feed pipe; and
discharging means for discharging said blow water, fed into said diffusing air feed pipe, from said aeration plate wherein said discharging means is constituted by an inserted pipe, an upper end of which communicates with said aeration plate and a lower end of which is inserted into said diffusing air feed pipe, and wherein said diffusing air and said blow water are fed to said aeration plate through said inserted pipe by feeding said blow water to said diffusing air feed pipe by said blow water feeding means.

2. The diffuser apparatus according to claim 1, wherein a lower end surface of said inserted pipe has an inclined suction surface through which said blow water is suctioned.

3. The diffuser apparatus according to claim 1, wherein an air hole is provided in a pipe wall of said inserted pipe.

4. The diffuser apparatus according to claim 2, wherein an air hole is provided in a pipe wall of said inserted pipe.

5. The diffuser apparatus according to claim 1, further comprising a check valve between said inserted pipe and said aeration plate surface of said aeration plate.

6. The diffuser apparatus according to claim 2, further comprising a check valve between said inserted pipe and said aeration plate surface of said aeration plate.

7. The diffuser apparatus according to claim 1, further comprising a blow-off pipe, one end of which is connected to said diffusing air feed pipe and another end of which is submerged in said aeration tank, thereby regulating internal pressure of said diffusing air feed pipe.

8. The diffuser apparatus according to claim 2, further comprising a blow-off pipe, one end of which is connected to said diffusing air feed pipe and another end of which is submerged in said aeration tank, thereby regulating internal pressure of said diffusing air feed pipe.

9. The diffuser apparatus according to claim 5, further comprising a blow-off pipe, one end of which is connected to said diffusing air feed pipe and another end of which is submerged in said aeration tank, thereby regulating internal pressure of said diffusing air feed pipe.

10. The diffuser apparatus according to claim 6, further comprising a blow-off pipe, one end of which is connected to said diffusing air feed pipe and another end of which is submerged in said aeration tank, thereby regulating internal pressure of said diffusing air feed pipe.

* * * * *

UNITED STATES PATENT AND TRADEMARK OFFICE
CERTIFICATE OF CORRECTION

| | |
|---|---|
| PATENT NO. | : 8,505,882 B2 |
| APPLICATION NO. | : 12/734866 |
| DATED | : August 13, 2013 |
| INVENTOR(S) | : Sakai et al. |

Page 1 of 1

It is certified that error appears in the above-identified patent and that said Letters Patent is hereby corrected as shown below:

Title Page

Please change

(73) Assignee: JEF Engineering Corporation to (73) Assignee: JFE Engineering Corporation Signed and Sealed this
Third Day of November, 2015

Michelle K. Lee
*Director of the United States Patent and Trademark Office*